United States Patent
Friedebach et al.

(10) Patent No.: US 10,843,368 B2
(45) Date of Patent: Nov. 24, 2020

(54) PARALLEL AND SQUARE ALIGNMENT TOOL

(71) Applicant: TSO Products, LLC, Fort Myers, FL (US)

(72) Inventors: Adolf Hans Friedebach, Fort Myers, FL (US); William D. Heidt, Columbus, IN (US)

(73) Assignee: TSO PRODUCTS, LLC, Fort Myers, FL (US)

( * ) Notice: Subject to any disclaimer, the term of this patent is extended or adjusted under 35 U.S.C. 154(b) by 0 days.

(21) Appl. No.: 16/718,350

(22) Filed: Dec. 18, 2019

(65) Prior Publication Data

US 2020/0215713 A1 Jul. 9, 2020

Related U.S. Application Data

(60) Provisional application No. 62/789,840, filed on Jan. 8, 2019.

(51) Int. Cl.
*B27B 9/04* (2006.01)
*B23Q 9/00* (2006.01)

(52) U.S. Cl.
CPC .............. *B27B 9/04* (2013.01); *B23Q 9/0014* (2013.01)

(58) Field of Classification Search
CPC ................................ B27B 9/04; B23Q 9/0014
See application file for complete search history.

(56) References Cited

U.S. PATENT DOCUMENTS

| 2,285,897 | A | * | 6/1942 | Campbell | B27G 5/023 83/415 |
| 2,773,523 | A | * | 12/1956 | Hopla | B23Q 17/2233 83/745 |
| 2,926,706 | A | * | 3/1960 | Hopla | B23Q 17/2233 83/486.1 |
| 3,241,585 | A | * | 3/1966 | Jureit | B27F 7/155 269/45 |

(Continued)

OTHER PUBLICATIONS

Festool (Germany) Parallel Guide Set Models 495718 and 203160 https://www.festoolusa.com/accessory/203160---fs-paf-fs-pa-vlf-set#Overview.

(Continued)

*Primary Examiner* — Nimeshkumar D Patel
*Assistant Examiner* — Tania Courson
(74) *Attorney, Agent, or Firm* — Cook Alex Ltd.

(57) ABSTRACT

An alignment tool is disclosed for connection to a work component and for use in aligning the work component with a work piece to establish a repeatable set up for cutting or routing of the work piece, and wherein the alignment tool provides for parallel and square alignment of the work component relative to first and second edges of the work piece that are perpendicular to each other. Use of the parallel and square alignment tool aligns the work component for an operation parallel to the second edge of the work piece and the operation may be conveniently repeated on further work pieces without need to measure and mark the work pieces. Optional use of first and second parallel and square alignment tools along opposed second and third edges of a work piece that are perpendicular to a first edge provides for greater accuracy for operations having a greater length.

12 Claims, 5 Drawing Sheets

(56) References Cited

U.S. PATENT DOCUMENTS

| | | | | |
|---|---|---|---|---|
| 3,304,967 A * | 2/1967 | Kujan | B23Q 9/0014 | 83/486.1 |
| 3,374,543 A * | 3/1968 | Bachmann | B43L 13/02 | 33/18.1 |
| 3,586,077 A * | 6/1971 | Pease | B23Q 9/005 | 30/376 |
| 4,062,123 A * | 12/1977 | Lundquist | B23Q 35/44 | 409/130 |
| 4,202,233 A * | 5/1980 | Larson | B23Q 9/0014 | 30/372 |
| 4,607,434 A * | 8/1986 | Francis | B23Q 17/2233 | 33/373 |
| 4,641,435 A * | 2/1987 | Brown | B25H 7/02 | 33/427 |
| 4,751,865 A * | 6/1988 | Buckalew | B23Q 1/40 | 83/486.1 |
| 4,871,156 A * | 10/1989 | Kozyrski | B26D 1/045 | 269/303 |
| 5,035,061 A * | 7/1991 | Bradbury | B23Q 9/0028 | 30/373 |
| 5,038,486 A * | 8/1991 | Ducate, Sr. | B27B 25/10 | 33/430 |
| 5,339,530 A * | 8/1994 | Wright | G01B 3/566 | 33/379 |
| 5,533,556 A * | 7/1996 | Whitney | B23Q 9/0042 | 144/144.1 |
| 5,716,045 A * | 2/1998 | Taylor | B23Q 1/28 | 269/303 |
| 5,768,966 A * | 6/1998 | Duginske | B27B 25/10 | 144/253.1 |
| 6,164,176 A * | 12/2000 | Larsson | B23Q 3/007 | 83/412 |
| 6,206,060 B1 * | 3/2001 | Blake | B23D 47/04 | 144/135.2 |
| 6,412,179 B1 * | 7/2002 | Ende | B23Q 9/0028 | 30/374 |
| 6,557,601 B1 * | 5/2003 | Taylor | B27B 27/02 | 144/253.1 |
| 6,901,680 B2 * | 6/2005 | Locaputo | B23Q 3/005 | 144/144.1 |
| 7,007,731 B2 * | 3/2006 | Chiu | B25B 1/08 | 144/144.1 |
| 7,305,773 B2 * | 12/2007 | Hios | B43L 7/10 | 33/429 |
| 7,587,838 B2 * | 9/2009 | Mastrobattista | B23Q 9/0042 | 33/427 |
| 7,610,839 B1 * | 11/2009 | Bessette | B23Q 9/0014 | 30/373 |
| 7,798,187 B1 * | 9/2010 | Duginske | B27B 27/02 | 144/253.1 |
| 7,930,960 B2 * | 4/2011 | Duginske | B23Q 3/007 | 144/253.1 |
| 8,205,865 B1 * | 6/2012 | Awadi | B23B 47/28 | 269/295 |
| 9,545,734 B2 * | 1/2017 | Suhling | B27B 27/10 | |
| 9,644,934 B2 * | 5/2017 | Hershkovich | G01B 3/566 | |
| 9,682,454 B2 * | 6/2017 | Suhling | B23Q 16/001 | |
| 10,357,893 B1 * | 7/2019 | Frolov | B27B 27/02 | |
| 10,363,681 B2 * | 7/2019 | Friedebach | B27B 9/04 | |
| 10,434,678 B1 * | 10/2019 | Friedebach | B23D 47/02 | |
| 10,704,882 B2 * | 7/2020 | Ursell | B25H 7/02 | |
| 2005/0061128 A1 * | 3/2005 | Caughlin | B23Q 9/0042 | 83/574 |
| 2014/0026725 A1 * | 1/2014 | Makropoulos | B27B 9/04 | 83/13 |
| 2020/0206856 A1 * | 7/2020 | Sheldon | B27C 5/04 | |

OTHER PUBLICATIONS

SENECA Woodworking Parallel Guide System (USA) hhttps://www.senecawoodworking.com/products/parallel-guide-system-for-incra-t-track-plus.

Woodpeckers (USA) https://www.woodpeck.com/accessories/festool-aftermarket-accessories/parallel-guide-system.html.

* cited by examiner

PARALLEL AND SQUARE ALIGNMENT TOOL

BACKGROUND OF THE INVENTION

Field of the Invention

The present invention generally relates to tools that provide temporary or longer term connection to a work component to establish a precision gage or guide, and more particularly a quick and accurate way to removably join a parallel and square alignment tool to a work component by using complementary reference surfaces.

Discussion of the Prior Art

The alignment and connection of separate elements of tools, fixtures, and guide assemblies often relies on use of channels, such as in the form of T-shaped slots, commonly referred to as "T-slots", in one or more of the components to be connected for temporary or longer-term use. This has been satisfactory for many uses but has serious limitations when precision and sturdiness of the connections are required. A common limitation with such prior art configurations relates to tools which aid only one but not all of the steps required to align both the square orientation of a sawcut or routing operation relative to a first edge of a work piece and parallelism of the cut being made in reference to a second existing edge of the work piece being cut or routed, with the second edge being oriented perpendicular to (at 90 degrees relative to) the first edge of the work piece. In light of the need to achieve alignment of work operations such as sawing or routing to two separate edges of the work piece an unmet need exists to achieve an accurate alignment in two separate but related dimensions in an efficient manner.

For instance, within existing prior art, when seeking to achieve parallelism relative to an edge of a work piece having a known perpendicular relationship between a first edge and a second edge, in a first step, one must manually mark the intended cutline by measuring from the second edge and placing a mark on the work piece at the location of the intended cut or routing. In a second step, a work component must be place along the first edge and the work component, such as a track saw rail, and must be moved to be aligned with the mark on the work piece. This can be done with one or more conventional layout tools, and can be more efficiently performed when the work component is a track saw rail that is aligned at an accurate 90 degree angle to the first edge of the work piece by using the alignment tool described in pending U.S. patent application Ser. No. 15/748,089, filed Jan. 28, 2018, the disclosure of which is hereby incorporated by reference herein in its entirety.

However, this leaves the work component susceptible to being inadvertently moved relative to the mark on the work piece anywhere along the work component. Also, in instances where the work piece is not known to have a perpendicular relationship between first and second edges, one must first use an alignment tool to make a perpendicular cut relative to an edge of the work piece, and then proceed with the above steps to attempt a cut or routing that is both perpendicular to a first edge of the work piece and parallel to a second edge of the work piece. Thus, at present, achieving the required parallelism of such a perpendicular cut or routing relative to an opposing edge on the work piece requires that the cutline is manually marked or one of several known methods of making a parallel cut is employed in additional steps that are separate from making a first squaring cut. Also, it will be appreciated that the sequence of the two cuts can be reversed without affecting or improving accuracy or efficiency of the operations.

No practical means has been introduced in the prior art that eliminates the need for use of a secondary tool or two or more steps to try to establish a cut line which is both perpendicular or square to a first edge of a work piece, as well as parallel to an already existing second edge of the work piece that is oriented perpendicular to the first edge of the work piece, where the cut or routing operation will be started.

SUMMARY OF THE INVENTION

The purpose and advantages of the present invention will be set forth in and apparent from the description and drawings that follow, as well as will be learned by practice of the claimed subject matter. It is the object of this invention to introduce a parallel and square alignment tool and method of using the alignment tool that effectively provide a connection to a work component which is precise, as well as simple, and resistant to unintended change during use. The present invention improves efficiency and accuracy when making a cut that is perpendicular to a first edge of the work piece while being parallel to a second edge of the work piece, by permitting accurate placement of the work component relative to the work piece in one layout step.

The present disclosure provides example alignment tools that utilize new structures and methods of connection to a work component, which are demonstrated for use with a work component, for example, in the form of a track saw rail. The alignment tools take into account the structure of the elongated aluminum extrusion of the track saw rail and its various surfaces that permit attachment of the track saw rail to a table or work piece, including the surfaces defined by the typical T-slot in the bottom of the track saw rail. However, unlike the prior art, the inventive alignment tools do not rely on multiple separate steps to achieve alignment when bringing the work component to first and successive work pieces, and avoid the aforementioned disadvantages of such traditional connections.

The disclosed parallel and square alignment tools simplify and speed up set up for repeatable perpendicular and parallel cuts or routing operations, while reducing the potential for dimensional variations when cutting or routing flat sheet materials to common square or rectangular shapes. In the construction of objects like cabinets, it is more critical that the components are identical than a particular precise dimension. In performing operations with portable power or hand tools, frequently the marking or layout of the operation to be performed requires more time than the actual operation using a power tool. Computer Numerical Controlled machine tools have solved this problem for industrial production. The present invention brings the handheld power tool user closer to the repeatable accuracy and speed of industrial operations, while enhancing the convenience and confidence during cutting and routing operations.

In a first aspect the disclosure provides an alignment tool for connection to a work component and for use in aligning the work component with a work piece, wherein the alignment tool provides for parallel and square alignment of the work component relative to first and second edges of the work piece that are perpendicular to each other, the alignment tool includes a square alignment portion that is configured to be removably connected to the work component, a parallel alignment portion that is configured to be removably connected to the square alignment portion, and wherein the parallel alignment portion includes a track.

In a second aspect, the disclosure provides an alignment tool for connection to a work component and for use in aligning the work component with a work piece, wherein the alignment tool provides for parallel and square alignment of the work component relative to first and second edges of the work piece that are perpendicular to each other, the alignment tool including a square alignment portion that is configured to be removably connected to the work component, a parallel alignment portion that is configured to be removably connected to the square alignment portion, and wherein the parallel alignment portion includes a track, and further in combination with a work component and a second alignment tool, with the second alignment tool further including a second square alignment portion that is configured to be removably connected to the work component, a second parallel alignment portion that is configured to be removably connected to the second square alignment portion, and wherein the second parallel alignment portion includes a second track.

In contrast to the prior art, the examples in the present disclosure rely on mating or bringing into abutting engagement existing complementary reference surfaces or guide surfaces, based on edges, features or shapes of the example alignment tools and work component to be connected, with the complementary reference surfaces or guide surfaces being of known accuracy suitable for repeatable precise aligning without need for use of a secondary tool, such as a precision gage, to check the alignment between the components.

BRIEF DESCRIPTION OF THE DRAWINGS

It is to be understood that both the foregoing general description and the following detailed description are exemplary and provided for purposes of explanation only, and are not restrictive of the subject matter claimed. Further features and objects of the present disclosure will become more fully apparent in the following description of the preferred embodiments and from the appended claims.

In describing the preferred embodiments, reference is made to the accompanying drawing figures wherein like parts have like reference numerals, and wherein.

Figure 1:
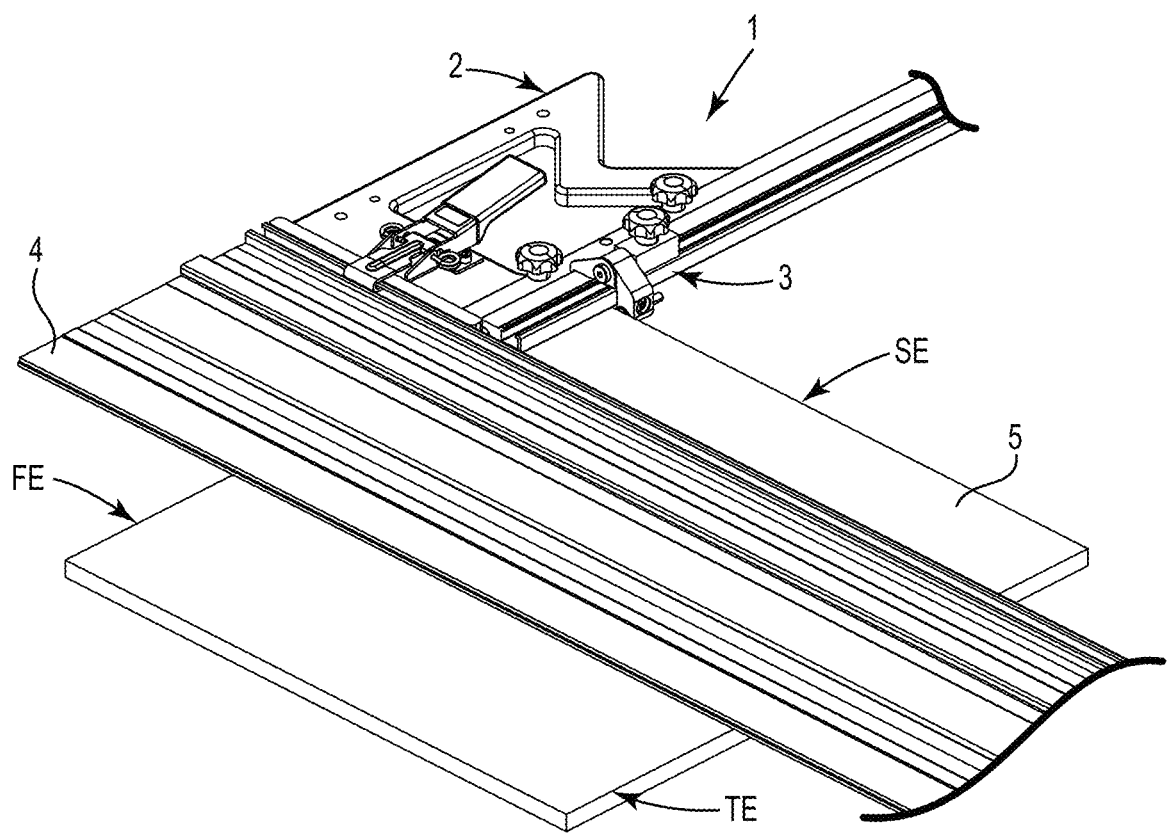
FIG. 1 is an upper perspective view of a first example parallel and square alignment tool removably connected to a work component in the form of a track saw rail proximate a first end of track saw rail and placed on top of a work piece, such as a wood panel.

It should be understood that the drawings are not to scale. While some mechanical details of example parallel and square alignment tools, including other plan and section views of the examples shown and of examples that may have alternative configurations have not been included, such details are considered well within the comprehension of those of ordinary skill in the art in light of the present disclosure. It also should be understood that the present invention is not limited to the example embodiments illustrated.

DETAILED DESCRIPTION OF THE PREFERRED EMBODIMENTS

For the following defined terms, these definitions shall be applied, unless a different definition is given in the claims or elsewhere in this disclosure. As used in this disclosure and the claims, the singular forms "a", "an", and "the" include plural referents unless the content clearly dictates otherwise. As used in this disclosure and the claims, the term "or" is generally employed in its sense including "and/or" unless the content clearly dictates otherwise.

Referring generally to FIGS. 1-5 it will be appreciated that parallel and square alignment tools of the present disclosure generally may be embodied within various configurations and used in various ways to enhance the convenience of users. Indeed, while acknowledging that all of the example configurations of parallel and square alignment tools need not be shown herein, examples are provided to better demonstrate that a variety of configurations and methods of use are contemplated.

Turning to a first example embodiment of a parallel and square alignment tool 1 shown in FIGS. 1-5, it will be appreciated that a square alignment portion 2 and a parallel alignment portion 3 may be connected together and further connected to a work component 4. The square alignment portion 2 and parallel alignment portion 3 may employ either existing or purpose made suitable complementary mating reference surfaces that are based on edges, features or shapes of the respective components. As noted previously, such complementary reference surfaces or guide surfaces that are to be used for abutting engagement may be defined, for example, by a broad flat surface, or at least two spaced apart aligned features that could be provided by any flat, curved, pointed or other surfaces, which together may be considered to define an elongated surface for purposes of providing abutting engagement, and which may be of known accuracy suitable for repeatable precise mating without need for use of a secondary tool.

One possible application is shown in the first example embodiment of the parallel and square alignment tool 1, which may be removably connected to the work component 4. In this example, the work component 4 is shown as a track saw rail, which essentially is a metal extrusion in the form of a track for guiding power tools, such as a track saw. For example, the work component or track 4 may be used with a handheld circular saw for cutting a work piece 5, such as a flat sheet material, which may be a wood panel in the form of plywood, pressboard or other wood or non-wood materials. In the particular configuration shown, the work component 4 may be used with a circular saw designed to be used with the track. Thus, the saw may incorporate or accommodate a base that is adapted for precision sliding movement along the extruded work component or track 4.

Figure 2:
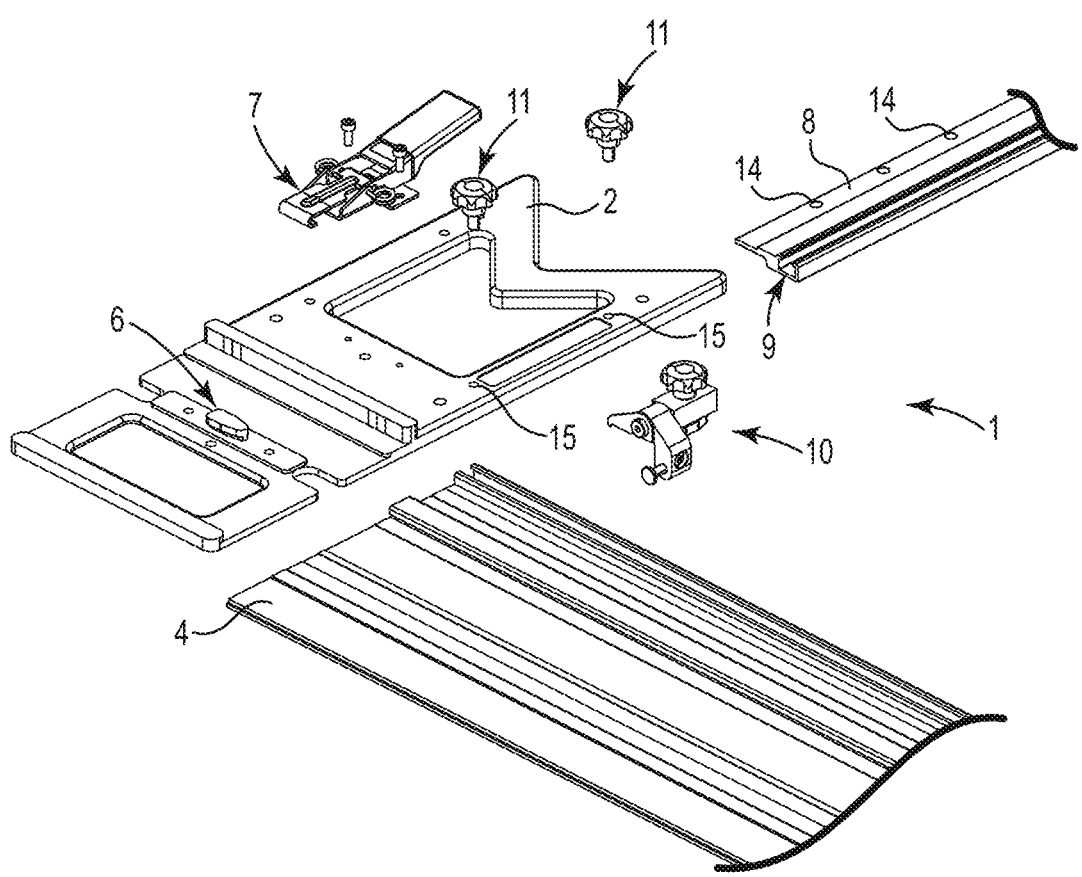
FIG. 2 is an exploded upper perspective view of the first example parallel and square alignment tool shown in FIG. 1.

Referring to FIGS. 1 and 2, the example square alignment portion 2 is removably connected to the work component 4 in the manner described in U.S. patent application Ser. No. 15/748,089, including by use of a retention element 6 and clamp assembly 7, seen in FIG. 2, that engage the work component 4. In FIG. 1, the square alignment portion 2 is removably connected to the work component 4 and is abutting a first edge FE of the work piece 5, which is shown as a piece of flat sheet material. Locating the square alignment portion 2 in this manner places the work component 4 perpendicular to (at a 90 degree angle to) and abutting the first edge FE of the work piece 5. In this example, the work piece 5 has a second edge SE that is perpendicular to the first edge FE of the work piece 5, and a third edge TE that is opposed to and parallel to the first edge FE, however, it will be appreciated by one of ordinary skill in the art that this need not be true of the work piece in all instances. To achieve a cut located at a selected distance from and parallel to the second edge SE of the work piece 5, the parallel alignment portion 3 is removably connected to the square alignment portion 2 to provide abutment against the second edge SE of the work piece 5 while the square alignment portion 2 abuts the first edge FE of the work piece 5.

Figure 3:
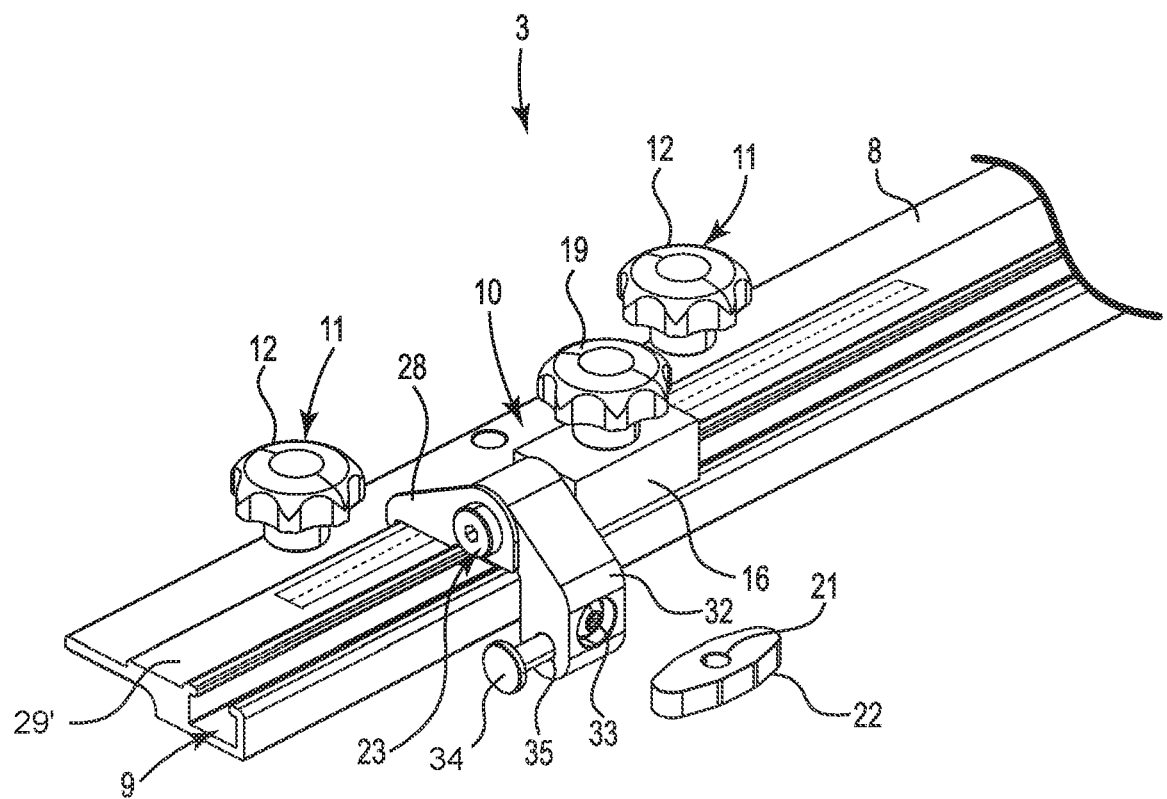
FIG. 3 is a partially exploded upper perspective view of a parallel alignment portion of the first example parallel and square alignment tool shown in FIGS. 1-2, which may be removably connected to the work component shown in FIG. 1, such as by connection to a square alignment portion of the first example parallel and square alignment tool that is in turn removably connected to the work component.
Figure 4:
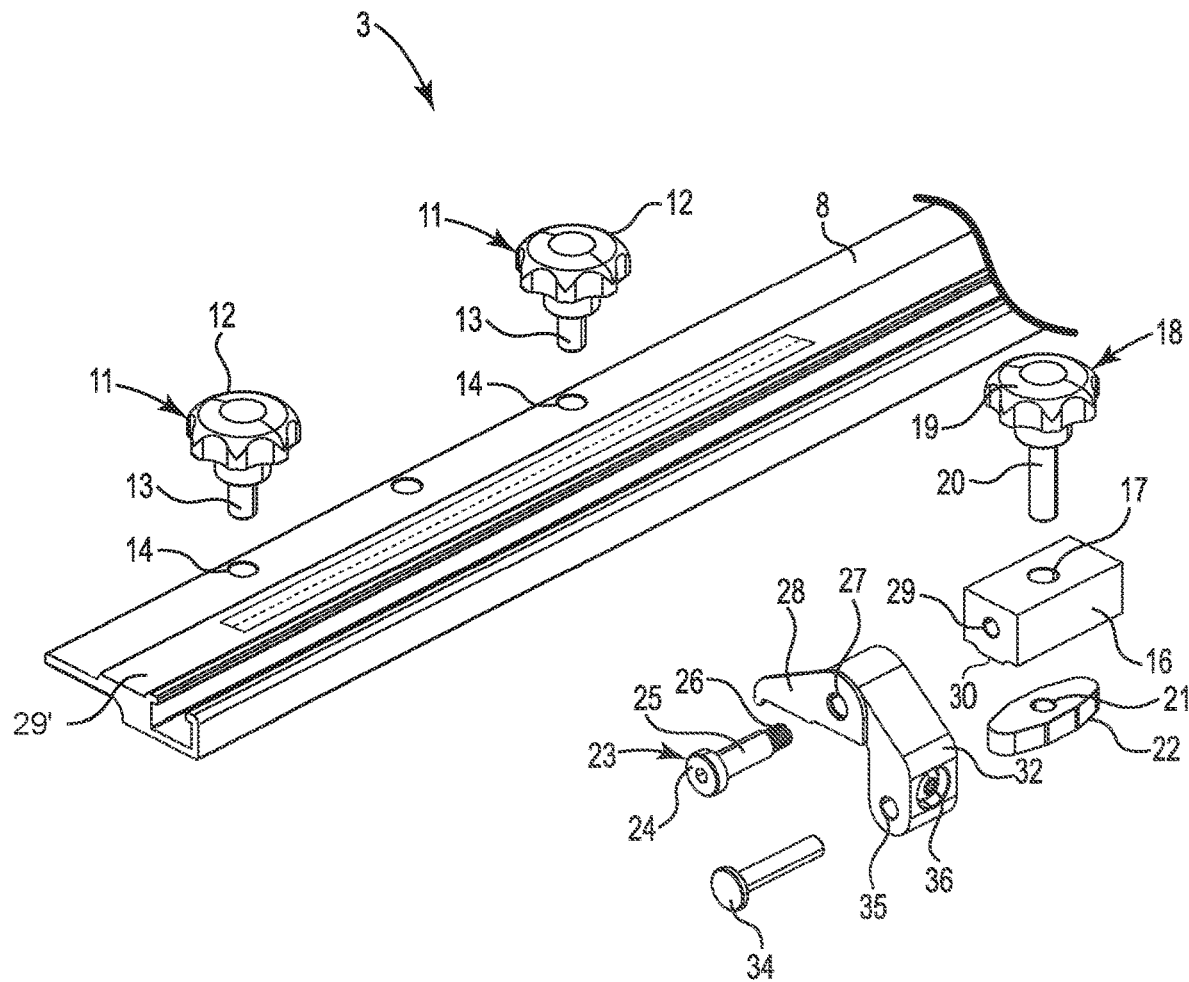
FIG. 4 is an exploded upper perspective view of a parallel alignment portion of the first example parallel and square alignment tool shown in FIGS. 1-3.

The parallel alignment portion 3 is removably connected to the square alignment portion 2. As best seen in FIGS. 3 and 4, the parallel alignment portion 3 includes a track 8 having a T-slot 9, and a movable arm assembly 10. The track 8 is connected to the square alignment portion 2 by use of fasteners 11, in the form of knobs 12 having threaded posts 13 that extend through apertures 14 in the track 8 and engage threaded apertures 15 in the square alignment portion 2, to permit turning of the knobs 12 to selectively clamp the parallel alignment portion 3 to the work component 4. In this example, the arm assembly 10 preferably also embodies a flipstop that abuts the second edge SE of the work piece 5. The arm assembly 10 may be located and locked in a selected position along the track 8 to establish the distance from the second edge SE of the work piece 5 for the desired cutting or routing operation. The arm assembly 10 includes a body 16 having an aperture 17 therethrough. An arm fastener 18 is in the form of a knob 19 having a threaded post 20 that extends through the aperture 17 in the body 16 and threadably engages a threaded aperture 21 in a retention element 22 that is slidably received in the T-slot 9 of the track 8, to permit turning of the knob 19 to selectively clamp the arm assembly 10 in place relative to the track 8.

The movable arm assembly 10 of this example optionally is configured to have a selectable flipstop construction. In particular, the movable arm assembly 10 includes a pivot post 23 having an enlarged head 24, a shaft 25 and a threaded distal end 26 that extends through an aperture 27 in a first arm portion 28 and threadably engages a threaded aperture 29 in the body 16. The first arm portion 28 extends across a raised portion 29' of the track 8 that optionally may have a scale or other indicia on the upper surface for accurate reference of the position of the first arm portion 28 relative to the track 8. The bottom of the body 16 may include a protrusion 30 that is essentially self-aligning with respect to the upward facing opening along the T-slot 9 in the track 8. The pivot post 23 is configured to extend through a second arm portion 32 and to allow the second arm portion 32 to pivot relative to the first arm portion 28.

The exact location of the movable arm assembly 10 can be set in reference to a mark or the previously mentioned optional scale indicia along the top surface of the track 8 in a manner which permits a quick and accurate visual reference when viewing the first arm portion 28 relative to such indicia along the track 8, as represented in a simplified manner in FIGS. 3 and 4. The second arm portion 32 of the parallel and square alignment tool 10 thereafter may serve as a flipstop, as it can be pivoted upward and out of the way if there is a desire to use the alignment tool only for square alignment purposes. The second arm portion 32 then may be pivoted downward to return to its use position when seeking to use both the square alignment portion 2 and parallel alignment portion 3 to achieve both parallel and square alignment of the work component 4 relative to the work piece 5. The second arm portion 32 is able to retain its position pivoted upward or downward in part due to friction within the movable arm assembly 10, which may be provided for example by use of a Belleville washer between the body 16 and the second arm portion 32, or other suitable means of providing controlled friction between the pivotable components of the movable arm assembly 10.

During initial set up, to compensate for any variation in the effective width between the mark or scale on the T-track 8 and the effective line of any desired cut or operation along the edge of the work component 4, a one-time adjustment can be made to the arm assembly 10 to control the effective distance from the second edge SE of the work piece 5 to the desired cut line by moving a calibration rod 34 relative to an aperture 35 through the second arm portion 32 of the arm assembly 10, and may be locked in place using a screw 36 in the second arm portion 32, as seen in FIG. 4. The flipstop provided by the movable arm assembly 10 thereafter may be quickly and conveniently used to ensure repeatable proper location for a cut or routing operation that will be parallel to the second edge SE of the work piece 5, without need to measure or mark a line on the work piece 5, or successive work pieces 5. Use of the parallel and square alignment tool 1 permits both squaring and setting a parallel cut line at a predetermined and selected distance from the second edge SE of a work piece 5 in one operation when using the square alignment portion 2 and parallel alignment portion 3 in combination with a work component 4, as best seen in FIG. 1.

The present invention combines the straightness of portable power tool operations or cuts made possible by work components like the extruded track saw rail 4, as shown in FIG. 1, with the simultaneous squaring accuracy of the guide rail square or square alignment portion 2, and the repeatable parallel edge guiding accuracy made possible by the parallel alignment portion 3 having the movable arm assembly 10 that provides the flipstop of the parallel alignment portion 3. Moreover, it will be appreciated that two or more movable arm assemblies 10 may be used on the same track 8, to establish two different parallel cutting or routing operations from which to choose simply by virtue of which of the flipstops is in the lowered position and which has been pivoted upward to be out of the way. Indeed, the use of two movable arm assemblies 10 can provide for very rapid switching to make parallel cuts of two different widths.

Figure 5:
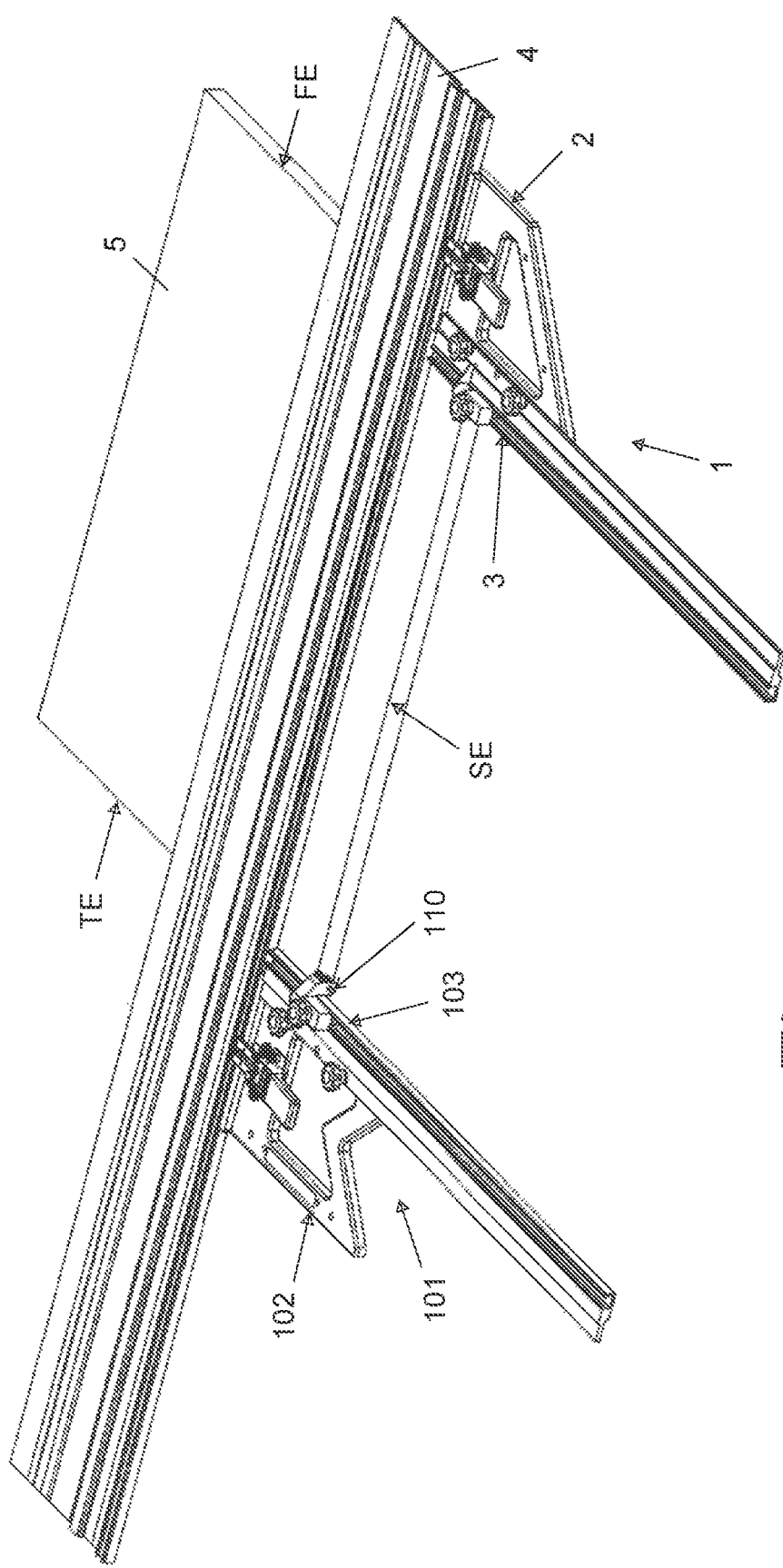
FIG. 5 is an upper perspective view showing use of two parallel and square alignment tools removably connected to a work component in the form of a track saw rail to assist in retaining parallelism for cuts over greater lengths, with a first of the parallel and square alignment tools proximate a first end of track saw rail and being placed on top of a work piece, such as a wood panel, and having the square alignment portion abutting a first edge of a work piece and the parallel alignment portion abutting a second edge of the work piece, and with the second of the parallel and square alignment tools connected along the work component and having the square alignment portion abutting a third edge of the work piece, which is opposed to the first edge of the work piece, and the parallel alignment portion abutting the second edge of the work piece.

FIG. 5 illustrates a second example providing a solution using an optional second parallel and square alignment tool 101. This arrangement may be selected for use in the event an especially long cut is to be made where small normal angular tolerances might introduce an undesirable variation in the parallelism of the cutting or routing operation relative to the second edge SE of the work piece 5. In particular, FIG. 5 shows an optional use of a second parallel and square alignment tool 101 that may be employed in abutting engagement with the first edge FE and third edge TE of the work piece 5. In this instance, the second parallel and square alignment tool 101 has a movable arm assembly 110 providing the flipstop along the opposite side of a square alignment portion 102, so as to provide a reversed orientation that can permit the square alignment portion 102 to abut the third edge TE of the work piece 5, while the moveable arm 110 of the parallel alignment portion 103 connected to the parallel alignment portion 102 abuts the second edge SE of the work piece 5.

An additional reason for optional use of a second parallel and square alignment tool 101 in a position spaced apart from a first parallel and square alignment tool 1 but along the same work component 4 would be to perform repeatable operations of making similar cuts or routings parallel to a straight edge along a side of a work piece. Thus, as long as a work piece has at least one straight side edge, which could be established by making a first cut using a track saw rail, then successive parallel cuts may be made by use of first and second parallel alignment portions 3 and 103 to set the work component 4 in a position parallel to the straight side edge. This is true, regardless of whether the respective edges of the work piece that are adjacent to the at least one straight side edge are perpendicular to the at least one straight side edge. Thus, the square alignment portions 2 and 102 need not engage end edges of the work piece while making such parallel cuts using the work component. This will result in the cutting of successive pieces having parallel opposed side edges, although the corresponding end edges of the pieces need not be perpendicular to the parallel side edges.

From the above disclosure, it will be appreciated that alignment tools for use with work components may be constructed in accordance with the present disclosure and may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such alignment tools, as well as in the method of assembling a parallel alignment portion and square alignment portion to a work component, without departing from the scope or spirit of the claimed subject matter, and that the claims are not limited to the preferred embodiments and methods illustrated herein. The example alignment tools shown herein may exhibit one or more of the above-referenced potential advantages, depending upon the specific design chosen. It also will be appreciated that the example embodiments may be shown in simplified form, such as without threading on some fasteners, so as to focus on the key components and to avoid including structures that are not necessary to the disclosure and that may over complicate the drawings.

The invention claimed is:

1. An alignment tool for connection to a work component and for use in aligning the work component with a work piece, wherein the alignment tool provides for parallel and square alignment of the work component relative to first and second edges of the work piece that are perpendicular to each other, the alignment tool comprising:
a square alignment portion that is configured to be removably connected to the work component;
a parallel alignment portion that is configured to be removably connected to the square alignment portion; and
wherein the parallel alignment portion includes a track; and
a movable arm assembly connected to the track, wherein the movable arm assembly is adjustable along the track.

2. The alignment tool in accordance with claim 1, wherein the track includes a T-slot for slidable engagement with the movable arm assembly.

3. The alignment tool in accordance with claim 2, wherein the movable arm assembly further comprises a body having a lower projection that is self-aligning with respect to an upward facing opening along the T-slot in the track.

4. The alignment tool in accordance with claim 2, wherein the movable arm assembly further comprises a retention element that is slidable within the T-slot of the track.

5. The alignment tool in accordance with claim 4, wherein the movable arm assembly further comprises a fastener that includes a knob and engages the retention element to clamp the movable arm assembly in place along the track.

6. The alignment tool in accordance with claim 1, wherein the movable arm assembly includes first and second arms, with the second arm being pivotable relative to the first arm.

7. The alignment tool in accordance with claim 6, wherein the second arm provides a flipstop that abuts the second edge of the work piece and the square alignment portion engaging the first edge of the work piece.

8. The alignment tool in accordance with claim 7, wherein the flipstop of the movable arm is pivotable away from engagement with the work piece to permit use of the square alignment portion without use of the parallel alignment portion.

9. The alignment tool in accordance with claim 1, further comprising a second movable arm assembly connected to the track.

10. The alignment tool in accordance with claim 1, further in combination with the work component and a second alignment tool, with the second alignment tool further comprising:
a second square alignment portion that is configured to be removably connected to the work component;
a second parallel alignment portion that is configured to be removably connected to the second square alignment portion; and
wherein the second parallel alignment portion includes a second track.

11. An alignment tool for connection to a work component and for use in aligning the work component with a work piece, wherein the alignment tool provides for parallel and square alignment of the work component relative to first and second edges of the work piece that are perpendicular to each other, the alignment tool comprising:
a square alignment portion that is configured to be removably connected to the work component;
a parallel alignment portion that is configured to be removably connected to the square alignment portion; and
wherein the parallel alignment portion includes a track; a first movable arm assembly connected to the track; a second movable arm assembly connected to the track; and
wherein each of the movable arm assemblies is adjustable along the track.

12. An alignment tool for connection to a work component and for use in aligning the work component with a work piece, wherein the alignment tool provides for parallel and square alignment of the work component relative to first and second edges of the work piece that are perpendicular to each other, the alignment tool comprising:
- a square alignment portion that is configured to be removably connected to the work component;
- a parallel alignment portion that is configured to be removably connected to the square alignment portion; and
- wherein the parallel alignment portion includes a track; a first movable arm assembly connected to the track; a second movable arm assembly connected to the track; and
- wherein each of the movable arm assemblies includes first and second arms, with the second arm being pivotable relative to the first arm, such that the first movable arm assembly can have its second arm in a lowered position while the second arm assembly has its second arm pivoted to a raised position.

* * * * *